Patented May 5, 1953

2,637,692

UNITED STATES PATENT OFFICE 2,637,692

OIL-BASE DRILLING FLUIDS

Paul G. Nahin, Long Beach, Calif., assignor to Union Oil Company of California, Los Angeles, Calif., a corporation of California No Drawing. Application October 27, 1950, Serial No. 192,597

10 Claims. (Cl. 252—8.5)

This invention relates to drilling fluids employed in the drilling of oil and gas wells, and in particular concerns drilling fluids of the oil-base type.

In drilling oil or gas wells by means of rotary drilling tools, a hollow drill pipe, known as a drill stem, having a bit attached to its lower end is extended downwardly through the well bore and rotated while the bit is pressed against the working face in the formation at the bottom of the hole. The action of the rotating bit grinds away the formation as the drilling progresses. During the drilling, a fluid body known as a drilling fluid or mud is continuously circulated downwardly through the drill stem, through the bit and against the working face of the hole, and then upwardly toward the surface through the annular space between the drill stem and the wall of the bore hole. The drilling fluid serves a number of purposes, among which are cooling and lubricating the drill bit, suspending and removing cuttings from the hole, preventing the flow of liquids from the formations traversed by the bore into the same by applying hydrostatic pressure to such formations, and fulfilling other requirements.

In instances where the underground formations are of such nature that they are not deleteriously affected by the presence of water it is customary to employ a drilling fluid of the water-base type, i. e., one consisting essentially of a continuous aqueous phase having suspended therein finely-divided solids of such nature and in such amounts that the desired physical properties are attained in the fluid. In many locations, however, as for example in certain California fields, the underground formations traversed and/or penetrated by the well bore are at least in part composed of hydratable clays, such as bentonite or montmorillonite, which swell in the presence of water to form gel-like bodies of low load-bearing properties. Where formations of this nature occur along the length of the bore, the introduction of water into the bore may give rise to its eventual collapse brought about by the walls becoming hydrated to a weak gel. On the other hand, where the producing formation contains hydratable clays the introduction of water into the bore causes such clays to swell, thereby greatly reducing the permeability of the formation and plugging up the pores and interstices through which the oil or gas flows into the well. In view of these difficulties, it has become common practice to employ substantially non-aqueous drilling fluids in locations where the underground formations traversed and/or penetrated by the bore contain hydratable clays. Such non-aqueous fluids essentially comprise an oil or hydrocarbon liquid, which is preferably of mineral origin, having dissolved and/or dispersed therein minor proportions of agents adapted to control the physical properties thereof, and are in general referred to as oil-base drilling fluids or muds.

The drilling fluids of the water-base type almost invariably contain a minor amount of a hydratable clay, such as bentonite or montmorillonite, which serves (1) to increase the gel strength of the fluid and thereby prevent the drill cuttings and suspended solid components of the fluid from settling out too rapidly, and (2) to plaster the walls of the bore with a substantially impervious coating and thereby prevent the fluid from escaping into permeable formations traversed by the bore. Such use of hydratable clays, however, can not readily be employed in oil-base drilling fluids, however, since such clays do not swell to form the necessary gel-like structure in the absence of water and do not form stable dispersions in oil. In some instances attempts have been made to adapt oil-base fluids to the use of hydratable clays therein by incorporating in the fluid sufficient water to hydrate the clay and/or through the use of auxiliary gel-strength or wall-building agents, e. g., fatty acids, soaps, lampblack, asphalt, etc. The use of such materials, however, leaves much to be desired. Certain of them, for example, are effective only in such high concentration that they adversely affect other properties of the fluid. Others are disagreeable to handle, whereas still others are unduly expensive or are subject to deterioration upon storage or long standing.

It is accordingly an object of the present invention to provide means for adapting hydratable clays to use as gel-strength and wall-building agents in oil-base drilling fluids.

Another object is to provide means for rendering clays readily dispersible in mineral oil.

A further object is to provide improved oil-base drilling fluids and methods of preparing the same.

Other objects will be apparent from the following description of the invention, and various advantages not specifically referred to herein will occur to those skilled in the art upon employment of the invention in practice.

I have now found that the above and related objects may be realized through the use of a clay which has been modified in such manner that it takes on the character of a lyophilic colloid capable of being solvated to a gel-like structure by hydrocarbon oils. More particularly, I have found that colloidal hydrophilic clays, e. g., bentonite, montmorillonite and the like, which have been heated to drive off interlaminar water and thereafter treated with a compound selected from the class consisting of glycols and glycol ethers have oleophilic rather than oleophobic surfaces and hence form stable dispersions in mineral oils and swell therein to impart gel strength properties to the oil. Such modified clays are admirably adapted for use as gel-strength and wall-building agents in oil-base drilling fluids since they are effective in relatively small amounts, and secure the desired modification of the properties of the fluid without adversely affecting other desirable properties. Moreover, they are readily prepared and handled, and do not deteriorate upon standing or storage. The invention thus consists in oil-base drilling fluids essentially comprising a major proportion of a base oil having dispersed therein a minor proportion of a modified clay of the type herein described.

I am aware that normally hydrophilic clays have been rendered lyophilic by subjecting them to a chemical reaction whereby the inorganic base exchangeable cations of the clay are replaced by organic cations, e. g., cationic amines, and that such clays have been proposed for use in oil-base drilling fluids. The lyophilic clays employed in the practice of the present invention, however, are fundamentally different from such chemically modified clays since the process whereby they are prepared is one of physical or structural modification and does not involve chemical replacement of inorganic cations. More particularly, the clays employed in the practice of the present invention are clays in which the molecular water which is normally held within the successive laminae of the clay particle has been removed and replaced by the glycol or glycol ether treating agent. The latter becomes absorbed by the clay particle in such manner that the relatively non-ionic hydroxyl or ether groups face toward the center of the clay laminae, leaving the surface covered with lyophilic polymethylene groups. The original cationic component of the clay molecule is retained unchanged.

The hydrophilic colloidal clays which may be treated as herein described for use in accordance with the invention are complex alumino-silicates, the anion of which is an alumina-silica-water complex and the cation of which may be hydrogen or a metal ion. Such clays are well known and are characterized by their property of being dispersible in water to form stable sols or thixotropic gels depending upon their concentration in the aqueous system. Because of this property they are customarily referred to as "hydratable clays." Bentonite and montmorillonite are typical of such clays, and because of their general availability are preferred for use according to the present invention. In general, however, any hydratable clay, or any soil containing a substantial amount of a hydratable clay, may be so employed.

As previously stated, the first step in the process whereby the above-described type of clay is modified for use in accordance with the invention consists in heating the clay to drive off the water which is normally absorbed between the laminae of the clay particle. Such water is known as "interlayer water" and is distinguished from the water which is chemically bound within the clay molecule as a part of the alumina-silica-water complex anion. Removal of the interlayer water does not appreciably affect the structure of the clay molecule, whereas removal of the chemically bound water results in transformation of the absorptive clay into a so-called "deadburned" material which is completely without absorptive powers. Accordingly, it is essential that the heat-treatment be effected under conditions of time and temperature sufficient to effect removal of a substantial amount of the interlayer water but insufficient to remove any substantial amount of the chemically bound water. Such conditions of time and temperature are interdependent and vary with the particular clay being treated. Ordinarily, however, heating at a temperature between about 250° and about 500° C., over a period of time between about 0.5 and about 10 hours will effect removal of substantially all of the interlayer water without removing any substantial amount of the chemically bound water. The latter is usually driven off only at temperatures above about 700° C.

Upon completion of the heat-treatment, the clay is cooled and then treated with a glycol or an alkyl glycol ether. Such treating agent may be employed as such or in the form of an alcoholic or other organic solvent solution. As examples of glycols and glycol ethers which have been employed in treating the dehydrated clay, there may be mentioned ethylene glycol, propylene glycol, tetramethylene glycol, pentamethylene glycol, decamethylene glycol, ethoxy-pentamethylene glycol, ethoxy - triethylene glycol, methoxy-triethylene glycol, the dimethyl ether of ethylene glycol, the dimethyl ether of triethylene glycol, the dimethyl ether of tetraethylene glycol, the mono ethyl ether of diethylene glycol, the monobutyl ether of ethylene glycol, etc. The glycols form a preferred class of treating agents.

Treatment of the dehydrated clay with the glycol or glycol ether consists merely in allowing the clay to stand in contact with the treating agent for a period of time sufficient to allow the latter to penetrate into the interlaminar spaces formerly occupied by the interlayer water. Usually, the clay is merely mixed with the treating agent to form a slurry which is allowed to stand for about an hour with occasional stirring. The treated clay is filtered off and dried at atmospheric or only slightly elevated temperature, and is then ready for use in preparing the new drilling fluids. If desired, it may be stored indefinitely for subsequent use.

The following examples are illustrative of the preparation of modified clays suitable for use according to the invention, but are not to be construed as limiting the same.

*Example I*

Wyoming bentonite containing about 6 per cent by weight of interlayer water is heated at about 350° C. for about one hour, after which it is allowed to cool to room temperature and is then stirred into sufficient ethylene glycol to form a thin slurry. The slurry is allowed to stand for about one hour with occasional stirring, and is then vacuum-filtered. The filtered clay is then vacuum-dried at about 80° C.

*Example II*

Montmorillonite (calcium cation) is heated at about 425° C. for about one-half hour, after which it is cooled and mixed with sufficient of a solution comprising equal parts by weight of ethanol and tetraethylene glycol dimethyl ether to form a slurry. The slurry is stirred for about two hours, after which the clay is filtered off and dried under vacuum at about 120° C. The dried clay product contains about 30 per cent by weight of the glycol ether, but none of the calcium cation has been displaced or exchanged.

*Example III*

Montmorillonite (sodium cation) is heated to constant weight at a temperature of about 275° C., and is then cooled and treated with propylene glycol as in Examples I and II. The treated clay is then filtered and dried at room temperature in a desiccator over anhydrous calcium chloride.

As previously stated, the drilling fluids provided by the invention essentially comprise a base oil having dispersed therein a lyophilic clay prepared as described above. The base oil is preferably a hydrocarbon oil of mineral origin and may be crude petroleum or a distillate or a residuum material. Distillates such as gas oil, kerosene, fuel oil, diesel fuel, lubricating oil, etc. have been found satisfactory as well as such heavier materials as light tars and asphalts, cracked residua, heavy extracts and the like. Usually it is desirable to employ a mixed base oil comprising two or more oils blended together to attain the desired physical properties. A mixed base oil of this type may comprise a major proportion, e. g., 60-90 per cent by weight, or a relatively heavy oil, such as a fuel oil having a gravity of about 12°-16° API, and a minor proportion, e. g., 10-40 per cent by weight, of a light oil such as a diesel fuel having a gravity of about 25°-35° API. The invention, however, is not limited to the use of any particular types of oil or mixtures thereof, and any of the base oils known in the art may be satisfactorily employed.

Inasmuch as the modified clay is readily dispersible in hydrocarbon oils, no special precautions or techniques need be observed in preparing the fluid. Usually the modified clay is simply stirred into the base oil employing conventional mixing equipment, e. g., a tank or other vessel equipped with an agitator, or the clay may be gradually added to the base oil while the latter is circulated from one pit to another at the well site. When the base oil is relatively heavy, e. g. crude oil, it is usually advantageous to promote the dispersion of the modified clay therein by first forming a relatively concentrated dispersion in a light oil, such as kerosene, and thereafter adding such light oil dispersion to the heavier base. The modified clay is employed in an amount sufficient to increase the gel strength of the base oil to the desired degree and to secure the desired wall-building properties. Such amount will of course depend upon the specific properties of the particular modified clay employed as well as upon the physical properties of the base oil and the presence or absence of other components of the fluid, e. g., weighting agents. Ordinarily, however, it is preferred to employ the modified clay in an amount representing between about 1 and about 20 per cent by weight of the entire fluid, the higher proportions within this range being employed when the fluid contains substantial quantities of a weighting agent.

While the drilling fluids provided by the invention in their simplest form comprise merely the base oil and the herein described modified clay, they usually also comprise a weighting agent to increase their specific gravity so that the fluid may provide a substantial hydrostatic head within the bore and thereby prevent ingress of fluids into the bore hole. Such weighting agents are usually finely-divided inorganic solids of high density, e. g., barytes, whiting, iron oxides, calcined clay, calcium carbonate, lead dust, sand, fuller's earth, and the like, and usually comprise from about 2 to about 25 per cent by weight of the entire composition.

In many instances the bore may traverse water-bearing as well as hydratable clay formations, and water is thereby introduced into the hydratable clay formation even though a non-aqueous drilling fluid is employed. In such cases, the drilling fluid may advantageously comprise a small amount, e. g., 1–10 per cent by weight, of a water-soluble alkaline-earth metal salt such as calcium chloride which has an inhibiting effect on the swelling of hydratable clays by water. The fluid may also contain a small amount of a dispersing agent such as an oil-dispersible soap for the purpose of helping to maintain solids uniformly dispersed in the fluid. The fluid may also contain an auxiliary wall-building agent, such as asphalt or clay, which serves to coat the walls of the bore and thereby prevent the fluid from escaping into permeable formations traversed by the bore.

In general, the principle upon which the present invention is based is not limited to any specific combination of drilling fluid components other than the base oil and the modified clay. The formulation of oil-base drilling fluids is well understood by those skilled in the art, and any of the various agents provided in such fluids for special purposes may be employed in those of the present invention.

The following examples will illustrate several ways in which the principle of the invention may be applied but are not to be construed as limiting the same.

*Example IV*

|  | Per cent by weight |
|---|---|
| Light diesel fuel, 31° API | 28.0 |
| Light fuel oil, 14.5° API | 60.0 |
| Hydrated lime | 0.4 |
| Sodium rosin soap | 4.0 |
| Water | 3.6 |
| Modified bentonite | 4.0 |
|  | 100.0 |

The hydrated lime is stirred into the diesel fuel, after which a dispersion of the rosin soap in the water is added with vigorous stirring. The modified bentonite, which is the ethylene glycol treated product described in Example I, is dispersed in about half of the fuel oil and is stirred into the mixture, after which the composition is diluted with the remainder of the fuel oil.

*Example V*

|  | Per cent by weight |
|---|---|
| Fuel oil, 16° API | 47.5 |
| Kerosene | 25.0 |
| Modified montmorillonite | 7.5 |
| Whiting | 20.0 |
|  | 100.0 |

The modified montmorillonite, which is a product prepared as described in Example II, is stirred into the kerosene, and the resulting dispersion is added to the fuel oil. The whiting, which serves as a weighting agent, is then added with stirring to obtain a uniform composition.

Example VI

| | Per cent by weight |
|---|---|
| Diesel fuel, 31° API | 78.5 |
| Modified bentonite | 5.0 |
| Aqueous calcium chloride | 15.0 |
| Potassium tall oil soap | 1.5 |
| | 100.0 |

The modified bentonite is a product prepared as described in Example I.

Example VII

| | Per cent by weight |
|---|---|
| Crude oil, 18° API | 68.0 |
| Modified clay | 7.0 |
| Crushed oyster shells | 25.0 |
| | 100.0 |

The modified clay is a local clay containing a high proportion of montmorillonite which has been dehydrated and treated with trimethylene glycol as herein described. The crushed oyster shells serve as a weighting agent.

Example VIII

| | Per cent by weight |
|---|---|
| Light fuel oil | 76.5 |
| Modified clay | 4.5 |
| Calcium mahogany sulfonate | 1.0 |
| Mixed iron oxides | 18.0 |
| | 100.0 |

The modified clay is a local clay of high montmorillonite content which has been heated and then treated with a 50 per cent alcoholic solution of the dibutyl ether of diethylene glycol.

Example IX

| | Per cent by weight |
|---|---|
| Diesel fuel, 31° API | 10.0 |
| Fuel oil, 16° API | 80.7 |
| Sodium soap of disproportionated wood rosin | 2.5 |
| Calcium oxide | 0.3 |
| Water | 2.0 |
| Modified bentonite | 4.5 |
| | 100.0 |

The modified bentonite, which is a product prepared as described in Example I, water and soap are stirred into a mixture of the diesel fuel and about one-fourth of the fuel oil to obtain a concentrate composition which can be stored indefinitely. When ready for use, the concentrate composition is diluted with the remainder of the fuel oil, and the calcium oxide is added with stirring.

Other modes of applying the principle of my invention may be employed instead of those explained, change being made as regards the methods or materials employed provided the composition stated by any of the following claims, or the equivalent of any such stated compositions, be obtained.

I, therefore, particularly point out and distinctly claim as my invention:

1. A drilling fluid composition essentially comprising a major proportion of a mineral oil and a minor proportion, sufficient to impart gel strength and wall-building properties to said oil, of a hydratable clay the normally incident interlayer water of which has been replaced by a liquid selected from the class consisting of glycols and alkyl ethers of glycols containing from 2 to 10 carbon atoms.

2. A composition according to claim 1 wherein the agent employed for treating the dehydrated clay is a glycol.

3. A composition according to claim 1 wherein the agent employed for treating the dehydrated clay is an alkyl ether of a glycol.

4. A composition according to claim 1 wherein the hydratable clay is bentonite.

5. A drilling fluid composition essentially comprising a major proportion of a mineral oil and a minor proportion, sufficient to impart gel strength and wall-building properties to said oil of a modified clay prepared by heating a hydratable clay at a temperature between about 250° and about 500° C. for from about 0.5 to about 10 hours, cooling the clay and forming a slurry of the cooled clay and an agent selected from the class consisting of glycols and alkyl ethers of glycols containing from 2 to 10 carbon atoms, allowing said slurry to stand until said agent is adsorbed into the inter-lamina spaces of the clay, and thereafter drying the clay containing the adsorbed agent.

6. A drilling fluid according to claim 5 wherein the agent employed for treating the heated clay is a glycol.

7. A drilling fluid according to claim 5 wherein the agent employed for treating the heated clay is ethylene glycol.

8. A drilling fluid according to claim 5 wherein the agent employed for treating the heated clay is propylene glycol.

9. A drilling fluid according to claim 5 wherein the agent employed for treating the heated clay is an alkyl ether of a glycol.

10. A drilling fluid according to claim 5 wherein the hydratable clay is bentonite.

PAUL G. NAHIN.

References Cited in the file of this patent

UNITED STATES PATENTS

| Number | Name | Date |
|---|---|---|
| 2,055,666 | Moore | Sept. 29, 1936 |